Feb. 27, 1923.
W. M. BOENNING
SNUBBER
Filed May 16, 1922
1,446,958
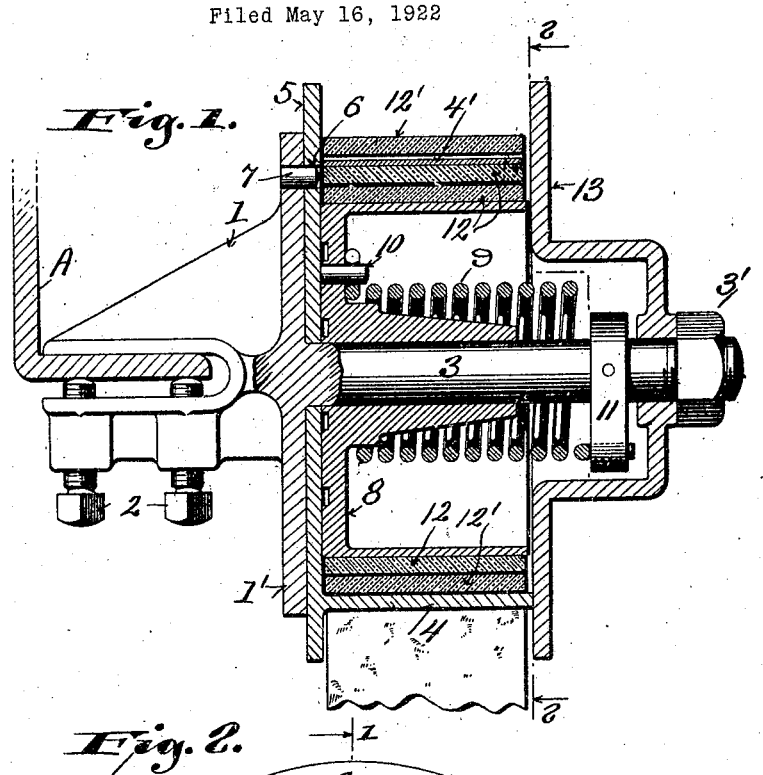
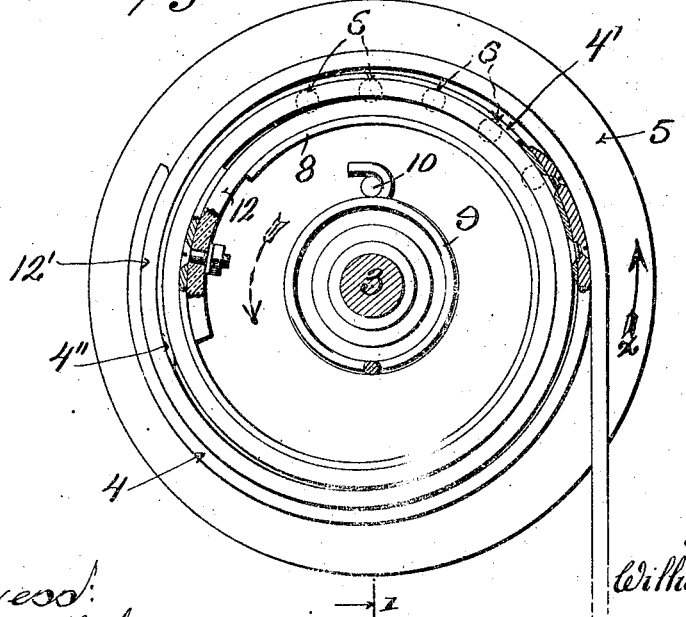
Inventor:
William M. Boenning Patented Feb. 27, 1923.                                                  1,446,958

UNITED STATES PATENT OFFICE.

WILLIAM M. BOENNING, OF MANITOWOC, WISCONSIN.

SNUBBER.

Application filed May 16, 1922. Serial No. 561,312.

*To all whom it may concern:*

Be it known that I, WILLIAM M. BOENNING, a citizen of the United States, and resident of Manitowoc, in the county of Manitowoc and State of Wisconsin, have invented certain new and useful Improvements in Snubbers; and I do hereby declare that the following is a full, clear, and exact description thereof.

My invention refers to re-coil shock absorbers, or what is generally termed, a snubber.

The object of my invention is to provide a simple, economical and effective rotary shock absorber of the strap and pulley type, wherein a maximum clutching surface results, together with compactness of structure.

The specific object of my invention is to provide a snubber, the construction and arrangement of which is such that a spring controlled pulley, carrying a coil strap, is nested within an interrupted circular shell, having a yieldable end section, whereby the strap, in an unwinding operation, is subjected to a friction gripping or clutch engagement upon multiple surfaces, which action is due to the fact that the resilient or yieldable shell will contract or compress under load strain exerted thereon, by a pull of the strap.

Another object of my invention is to provide means in connection with the circular shell for adjusting the same, whereby variation in the friction surface may be had to increase or decrease the clutching action, in a snubbing operation, in proportion to the load of the vehicle to which the device is attached.

With the above objects in view, the invention consists in certain peculiarities of construction and combination of parts as are hereinafter set forth with reference to the accompanying drawings and subsequently claimed.

In the drawing,

Figure 1 represents a sectional elevation of a snubber, embodying the features of my invention, the section being indicated by line 1—1 of Figure 2, and Figure 2, a face view of the snubber, parts of the same being removed and other parts in section, as indicated by line 2—2 of Figure 1.

Referring by characters to the drawings, A represents a fragment of a chassis or frame of a vehicle. Secured thereto, is a jawed hub 1, the same veing affixed by set screws 2. The hub 1 is formed with a disk 1', which disk has extended therefrom, a stud 3, having a screw threaded end. Loosely mounted upon the stud 3 is a shell 4, a rear flange 5 of which shell is provided with a series of concentrically arranged apertures 6, as best indicated in dotted lines of Figure 2. Any one of these apertures is selectively arranged to engage a locking pin 7, that projects inwardly from the hub disk 1'.

As best shown in Figure 2, the circular shell 4, in this exemplification of my invention, is partly rigid in structure and has attached thereto, a spring section or end 4'. The yieldable end is in spiral form and the free end 4", of the yieldable end section underlaps the outer rigid end portion of the shell. Obviously, while I have shown the yieldable end 4', as screwed or riveted to the rigid section of the shell, the said spring end may, in some instances, be integral therewith, or the spring end may consist of a plurality of spring sections nested together to add rigidity and life to the structure.

Rotatably mounted upon the stud 3 and encased within the shell 4, is a pulley 8. A coil spring 9 is fitted over and about the hub of the pulley and the stud 3. One end of the spring is attached by a pin 10 to the pulley and the opposite outer end of the spring is suitably secured to the stud 3 by a collar 11 which is fastened to said stud. Hence it will be seen that when the pulley is rotated clockwise, the coil spring will be wound, and upon release of load strain upon said pulley, the coil spring will cause the same to rotate in a direction of the arrow, as indicated in Figure 2.

In this exemplification of my invention, the face of the pulley, for convenience, is interrupted, and it has secured thereto, one end of a belt or strap 12. The strap is normally trained or coiled about the face of the pulley, for example, 1¼ turns, and the outer coil 12' of the strap is thereafter trained over the outer face of the yieldable end section of said shell, and from thence it travels over a rigid portion of the shell downwardly to a fastening device carried by the vehicle axle, not shown.

Hence it will be seen that the flexible floating end 4" of the end section 4' is snugly nested between two coils of the strap. Should the vehicle frame and axle tend to spread apart under re-coil shock conditions, it will be observed that the pulley will revolve against the spring pressure and the strap will thus uncoil from its nested engagement with the pulley and shell. In effecting this uncoiling, due to pull of the strap, the outer coil 12' of said strap will exert a spring pressure upon the end 4'' of the yielding shell section, and this pressure will, in turn, be exerted upon the outer face of the next coil of the strap or band, whereby the frictional resistance will be increased to a maximum. In other words, when the strap is played off of the pulley, it will exert a maximum friction grip upon the fixed shell surfaces, both as to the rigid surface of the shell and the yielding surface thereof. Hence it will be seen that the maximum of friction between the shell and strap is obtained in a structure of minute proportions. Upon release of the spreading strain between the axle and frame of the vehicle, it will be noted that the take-up coil spring 9 will rewind the strap upon the face of the pulley or shell.

It will be apparent that the frictional breaking surfaces between the coil strap and circular shell body can be increased or diminished, due to adjustment of the shell 4 upon the stud 3. For example, by referring to Figure 2 of the drawings, if it is desired to increase the frictional area between the strap and shell, the said shell can be manually rotated in the direction of the arrow $x$, and if it is desired to decrease the frictional surface, the shell may be rotated in the opposite direction. This adjustment of the shell to vary the frictional resistance between the snubber elements is obtained by loosening a retaining nut 3', which is in threaded union with the end of the stud 3. After such loosening, a cover flange or housing 13, together with the flange 5 of the shell, is shifted axially upon the stud 3, so as to effect a disengagement between the pin 7 and the aperture 6 of the flange or web 5. In shifting the shell longitudinally, it will be observed that the coil spring will be slightly compressed, and after the proper adjustment of the shell upon its axis, the selected aperture 6 in the shell web or flange, is permitted to engage the pin 7, whereby said shell is locked in its adjusted position. This adjustment of the shell to increase or decrease the surface, is an important feature of my invention, as it renders the structure capable of meeting conditions of light and heavy load.

An important feature, however, of this invention, is the provision of a circular frictional shell body, having a yieldable end section, whereby a double gripping surface will result with reference to the coil strap upon the pulley.

While I have shown and described a simple exemplication and a practical construction for carrying out my invention minutely as to details, it is understood that the structural features may all be varied within the scope of the claims, as they may be hereinafter interpreted by those skilled in the art.

I claim:

1. In a vehicle shock absorber, the combination of members forming means for attachment to a relatively movable axle and frame; a hub carried by one of the members, the same including an interrupted circular shell, having a yieldable end section, a spring controlled pulley mounted therein, and a strap connecting the pulley and other vehicle member, the strap being trained over the shell, whereby a double clutching engagement between the shell and strap is effected when said strap is unwound from the pulley.

2. In a vehicle shock absorber, the combination of members forming an attachment to a relatively movable axle and hub frame; a hub carried by one of the members including an interrupted circular shell having an inner yieldable end, a spring controlled pulley mounted within the shell, a strap coiled about the pulley and trained over the yieldable end of the shell, whereby the upper and lower surfaces of the yieldable shell end will effect a clutching engagement between the surfaces of the aforesaid strap in a snubbing operation.

3. In a vehicle shock absorber, the combination of members forming an attachment to a relatively movable axle and hub frame; a hub carried by one of the members including an interrupted circular shell having an inner yieldable end, a spring controlled pulley mounted within the shell, a strap coiled about the pulley and trained over the yieldable end of the shell, whereby the upper and lower surfaces of the yieldable shell end will effect a clutching engagement between the surfaces of the aforesaid strap in a snubbing operation, and means for adjusting and locking the shell, whereby its surface with relation to the frictional engagement of the strap is varied.

4. A snubber comprising a hub member including a disk and stud, an interrupted circular shell mounted upon the hub member, means for rotatorily adjusting and locking the shell with relation to the hub member, a spring section secured to one of the interrupted ends of the circular shell and forming a continuation thereof, a spring controlled rotary pulley mounted upon the hub stud within the shell body, and a strap carried by the pulley having coils trained thereabout and also about the outer surface of the spring end of the shell body, whereby a double gripping surface is effected between the spring end of the shell and coils of the aforesaid strap.

5. In a vehicle shock absorber, the combination of members forming an attachment to a relatively movable hub frame; a spring controlled pulley mounted on one of the members, a circular shell disposed about the pulley having a yieldable portion, and a strap coiled about the pulley and over the yieldable end of the shell, the opposite end of the strap being secured to the other member.

In testimony that I claim the foregoing I have hereunto set my hand at Manitowoc, in the county of Manitowoc and State of Wisconsin.

WILLIAM M. BOENNING.